(12) United States Patent
Li et al.

(10) Patent No.: US 8,103,321 B2
(45) Date of Patent: Jan. 24, 2012

(54) SLIDING MECHANISM AND PORTABLE ELECTRONIC DEVICE USING THE SAME

(75) Inventors: Jian Li, Shenzhen (CN); Jin-Xin Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 919 days.

(21) Appl. No.: 12/122,743

(22) Filed: May 19, 2008

(65) Prior Publication Data

US 2009/0149229 A1    Jun. 11, 2009

(30) Foreign Application Priority Data

Dec. 11, 2007    (CN) .......................... 2007 1 0202977

(51) Int. Cl.
*H04M 1/00* (2006.01)

(52) U.S. Cl. ............... 455/575.4; 455/575.1; 455/575.3; 455/90.3; 379/433.12; 248/429; 248/307; 248/432; 248/244

(58) Field of Classification Search ............... 455/575.1, 455/575.3, 575.4, 90.3; 379/433.12; 248/429, 248/307, 432, 244
See application file for complete search history.

(56) References Cited

U.S. PATENT DOCUMENTS

| | | | | |
|---|---|---|---|---|
| 7,529,571 B2* | 5/2009 | Byun et al. | ................. | 455/575.4 |
| 7,599,723 B2* | 10/2009 | Lee et al. | .................... | 455/575.4 |
| 7,818,038 B2* | 10/2010 | Huang | ........................ | 455/575.4 |
| 2005/0164753 A1* | 7/2005 | Kato | .......................... | 455/575.4 |
| 2008/0200222 A1* | 8/2008 | Jang et al. | ................. | 455/575.4 |
| 2009/0005135 A1* | 1/2009 | Lindgren et al. | ........... | 455/575.4 |

FOREIGN PATENT DOCUMENTS

| | | |
|---|---|---|
| CN | 1961491 A | 5/2007 |
| CN | 1976567 A | 6/2007 |

* cited by examiner

*Primary Examiner* — Patrick Edouard
*Assistant Examiner* — Shantell L Heiber
(74) *Attorney, Agent, or Firm* — Altis Law Group, Inc.

(57) ABSTRACT

An exemplary sliding mechanism (10) includes a main plate (11), a slide plate (12) slidably connected to the main plate (11), and a linkage module positioned between the main plate (11) and the slide plate (12). The linkage module includes an elastic member (15) and a guiding shaft (17). The elastic member (15) is sleeved on the guiding shaft (17). Two ends of the guiding shaft (17) is rotatably connected to the main plate (11) and the slide plate (12) respectively. The elastic member (15) is configured for driving the slide plate (12) and enabling the slide plate (12) to slide along the main plate (11) after the slide plate (12) is manually moved to a predetermined position with respect to the main plate (11).

16 Claims, 8 Drawing Sheets

SLIDING MECHANISM AND PORTABLE ELECTRONIC DEVICE USING THE SAME

BACKGROUND OF THE INVENTION

1. Field of the Invention

The present invention generally relates to sliding mechanisms, and more particularly, to a sliding mechanism used for a portable electronic device with two or more housings.

2. Discussion of the Related Art

Sliding mechanisms are widely used in portable electronic devices, such as mobile phones and personal digital assistants (PDAs). Referring to FIG. 8, a typical sliding mechanism generally includes a first plate 50, a second plate 60, and a linkage module (not labeled) configured for linking the first plate 50 and the second plate 60. The first plate 50 and the second plate 60 are substantially rectangular in shape. The linkage module includes two fixing members 52, two shafts 62, two rails 65, and two springs 67. The fixing members 52 are fixed to the center portion of the second plate 60 and aligned along a same line. Each fixing member 52 defines a through hole (not labeled) therein. The shafts 62 are fixed adjacent to opposite sides of the first plate 50 respectively. An end of each rail 65 is slidably inserted through the through hole of the fixing members 52, and an opposite end of each rail 65 is rotatably connected to the shafts 62. The rails 65 are rotatable about an axis of the corresponding shafts 62. Each spring 67 is sleeved on the corresponding rails 65 between the fixing members 52 and the shafts 62.

In use, in a starting position, the second plate 60 is at an end of the second plate 60, and the second plate 60 is open or closed relative to the first plate 50. When the second plate 60 of sliding mechanism 100 is pushed by an external force, the second plate 60 is moved relative to the first plate 50. As such, the fixing members 52 are moved together with the second plate 60. At this time, the rails 65 slide relative to the through hole of the fixing members 52, and rotate about the axes of the shafts 62. A distance between the fixing members 52 and the shafts 62 is decreased. Thus, the spring 67 becomes compressed and accumulates potential energy until the second plate 60 reaches the middle of the first plate 50. When the second plate 60 is pushed across the middle of the first plate 50, the external force is removed. The potential energy of the springs 67 is released and pushes the second plate 60 to slide further, until the second plate 60 is closed or open relative to the first plate 50.

However, the sliding mechanism causes several problems. Firstly, since the springs 67 are disposed above the first plate 50 and the second plate 60, when the sliding mechanism is employed in an electronic device and the second plate 60 slides relative to the first plate 50, the springs 67 may be blocked by other components of the electronic device. Thus, the sliding mechanism cannot be normally operated, and the springs 67 may be damaged. Secondly, two rails 65 require a relatively large space for movement. Thirdly, the first plate 50 and the second plate 60 are disposed on a same side of the rails 65 and the spring 67. A width of the first plate 50 should be larger than that of the second plate 60 so that the shafts 62 can be fixed to the first plate 50. Therefore, the sliding mechanism occupies a relatively large volume. Fourthly, the linkage module of the sliding mechanism includes so many components, causing high production costs.

What is needed, therefore, is a sliding mechanism which overcomes the above-described shortcomings.

SUMMARY

An exemplary sliding mechanism includes a main plate, a slide plate slidably connected to the main plate, and a linkage module positioned between the main plate and the slide plate. The linkage module includes an elastic member and a guiding shaft. The elastic member is sleeved on the guiding shaft. Two ends of the guiding shaft are rotatably connected to the main plate and the slide plate respectively. The elastic member is configured for driving the slide plate to slide along the main plate after the slide plate is manually moved to a predetermined position with respect to the main plate.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present sliding mechanism and portable electronic device. Moreover, in the drawings, like reference numerals designate corresponding parts throughout the several views, and all the views are schematic.

DETAILED DESCRIPTION OF THE EMBODIMENTS

Reference will now be made to the drawings to describe embodiments of the present sliding mechanism in detail.

Figure 1:
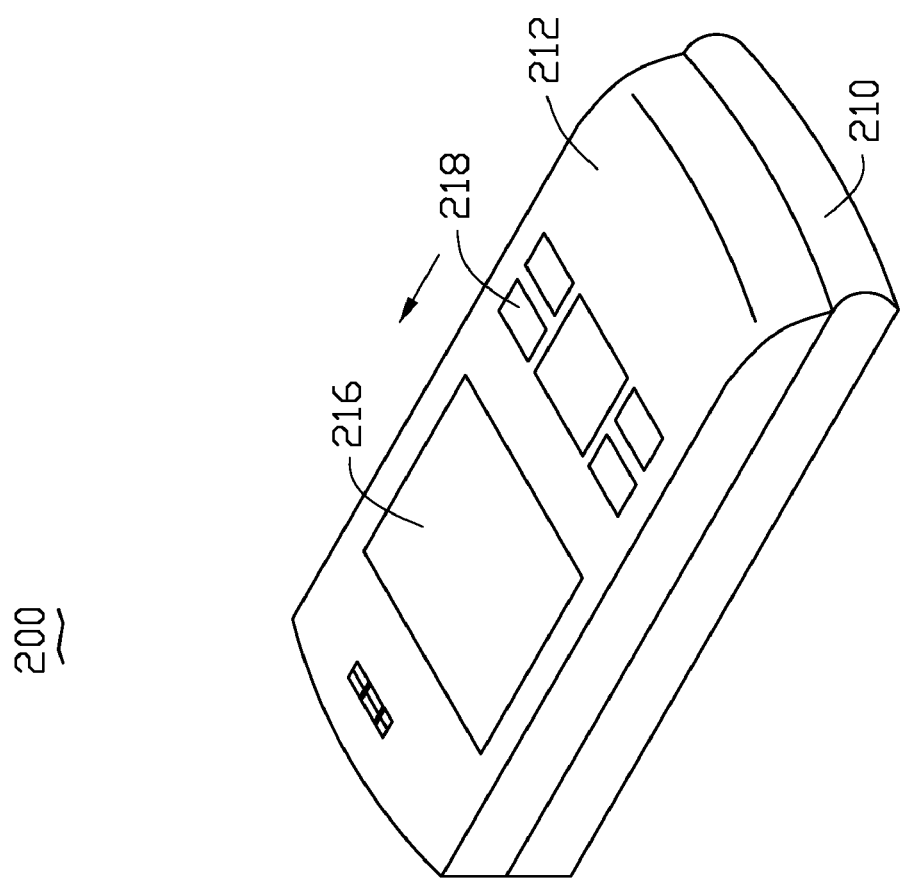
FIG. 1 is an isometric view illustrating a closed state of a sliding-type portable electronic device in accordance with a first exemplary embodiment of the present invention.
Figure 2:
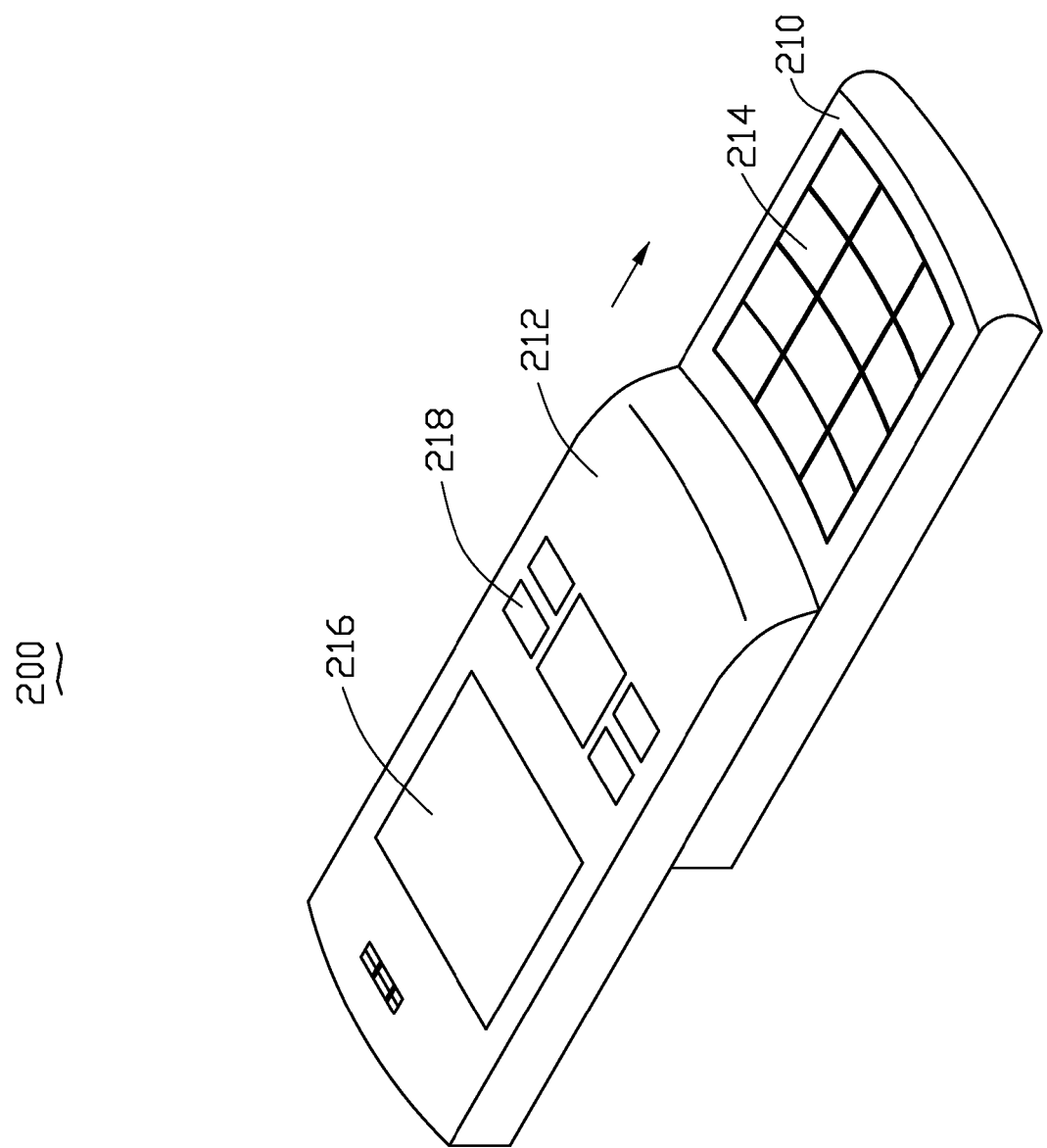
FIG. 2 is similar to FIG. 1, but showing an opened state of the present sliding-type portable electronic device.
Figure 3:
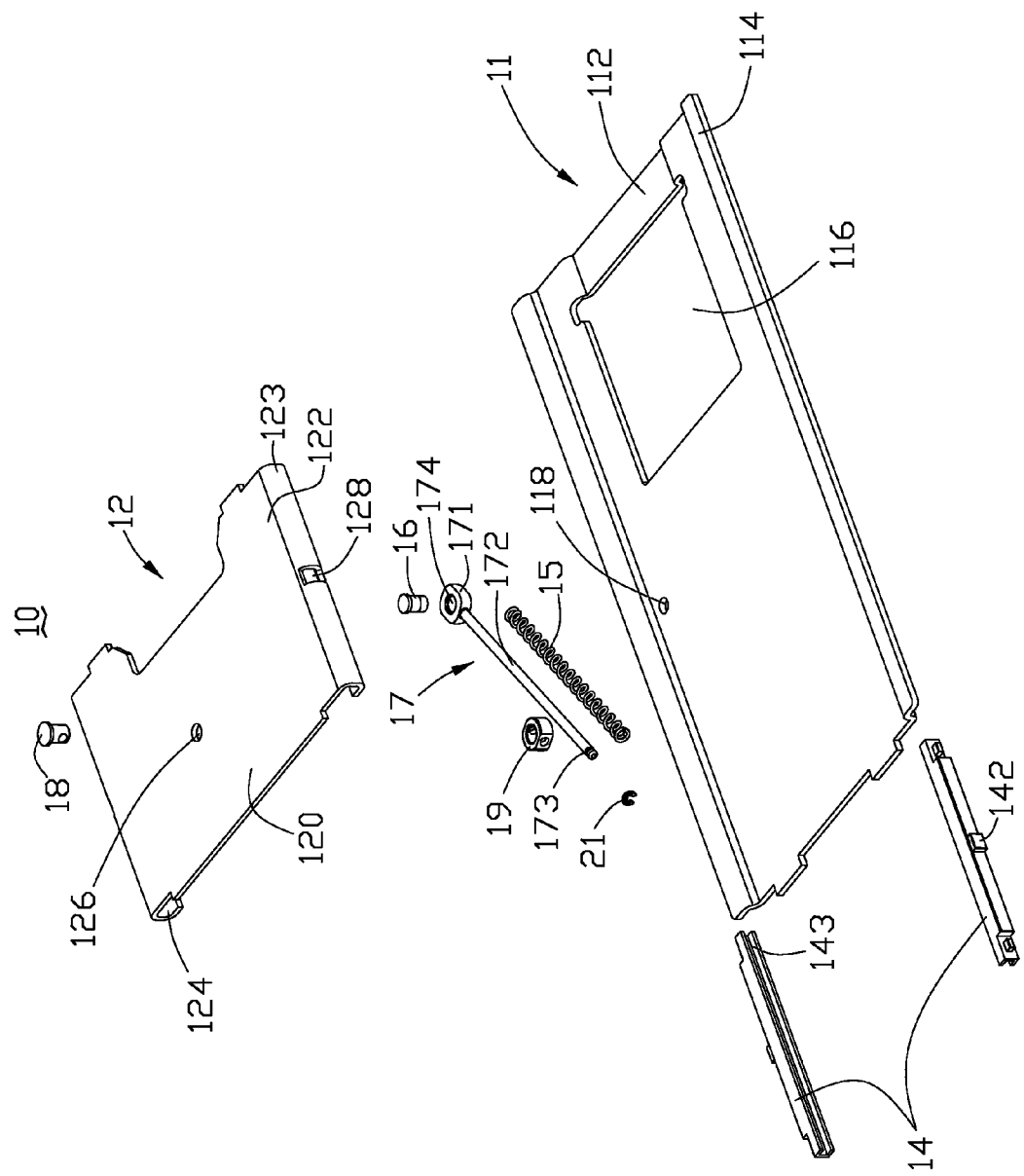
FIG. 3 is an exploded, isometric view of a sliding mechanism used for the sliding-type portable electronic device of FIG. 1, including a slide plate and a main plate.

Referring to FIGS. 1 through 3, a sliding mechanism 10 according to a first exemplary embodiment of the present invention is adapted for use in portable electronic device 200. The portable electronic device 200 includes a first housing 210, a second housing 212 engaging with the first housing 210 and a sliding mechanism 10. The sliding mechanism 10 is positioned between the first and second housings 210, 212 for making the second housing 212 slidable relative to the first housing 210. The first housing 210 is provided, at a front surface thereof, with a keypad 214. The second housing 212 is provided, at a front surface thereof, with a display 216 and a plurality of function keys 218. The second housing 212 slides relative to the first housing 210, thus exposing or covering the keypad 214.

The sliding mechanism 10 includes a main plate 11, a slide plate 12, a pair of guiding rails 14, an elastic member 15, and a guiding shaft 17. The main plate 11 and the slide plate 12 are respectively fixed to the first housing 210 and the second housing 212.

The main plate 11 of the sliding mechanism 10 is substantially rectangular and includes a main body 112. A pair of slide portions 114 extends from the two opposite long sides of the main body 112 respectively. The main body 112 defines an oblong hole 116 adjacent to an end portion thereof and a pinhole 118. The oblong hole 116 is configured for assembling the sliding mechanism 10 easily. The pinhole 118 is adjacent to the slide portions 114 and approximately in the middle of the main plate 11.

The slide plate 12 of the sliding mechanism 10 is substantially rectangular sheet-shaped. The slide plate 12 defines an engaging hole 126 approximately in the center thereof. The width of a first side 120 of the slide plate 12 is approximately the same as that of a shorter side of the main plate 11. Two second sides 122 are respectively oriented perpendicular to the first end 120 and are opposite and parallel to one another. An arcuate sidewall 123 extends from each second side 122, thereby defining a receiving groove 124 for receiving the guiding rails 14 of the sliding mechanism 10 respectively. Each arcuate sidewall 123 defines a latching hole 128.

The guiding rails 14 are substantially rail-shaped. A first sidewall (not labeled) of each of the guiding rails 14 defines a guiding slot 143, and a second sidewall (not labeled) opposite to the first sidewall forms a latching protrusion 142. The latching protrusions 142 engage with the latching holes 128 of the slide plate 12 so that the guiding rails 14 may move together with the slide plate 12. The elastic member 15 is a helical spring, and is extendable and compressible.

The guiding shaft 17 includes a connecting portion 171 and a shaft portion 172. A length of the guiding shaft 17 is slightly smaller than a width of the main body 112 of the main plate 11. The connecting portion 171 is formed on an end of the shaft portion 172, and the connecting portion 171 defines an engaging hole 174 in the center thereof. A cylindrical surface of an opposite end of the shaft portion 172 defines a fixing groove 173.

The sliding mechanism 10 further includes a first rivet 16, a second rivet 18, a rivet sleeve 19 and a fixing member 21. Each of the second rivet 18 and the rivet sleeve 19 defines a through hole (not labeled). The through holes extend through the second rivet 18 and the rivet sleeve 19 respectively, i.e., each through hole has an axis perpendicular to an axis of the corresponding second rivet 18 and the rivet sleeve 19. The opposite end of the shaft portion 172 of the guiding shaft 17 is configured for inserting into the through holes of the second rivet 18 and the rivet sleeve 19.

The fixing member 21 is substantially a C-shaped clip. The fixing member 21 is configured for engaging in the fixing groove 173 of the guiding shaft 17.

In assembly of the sliding mechanism 10, the guiding rails 14 are received in the receiving grooves 124 of the slide plate 12 respectively, with the latching protrusions 142 of the guiding rails 14 engaging with the latching holes 128 of the slide plate 12. An end of the guiding shaft 17 is rotatably attached to the main plate 11, via the first rivet 16 engaging in the engaging hole 174 of the guiding shaft 17 and the pinhole 118 of the main plate 11. Thus, the guiding shaft 17 is attached to the main plate 11. The elastic member 15 is sleeved on the shaft portion 172 of the guiding shaft 17. After that, the slide portions 114 of the main plate 11 are inserted into the guiding slots 143 of the guiding rails 14 respectively, so that the guiding rails 14 are slidably connected to the main plate 11. As such, the slide plate 12 is slidable relative to the main plate 11 because the slide plate 12 is attached to the guiding rails 14.

Next, the second rivet 18 is inserted into the engaging hole 126 of the slide plate 12 and the rivet sleeve 19. The second rivet 18 and the rivet sleeve 19 are rotatably connected to the slide plate 12. Then, the opposite end of the guiding shaft 17 protrudes through the pinholes of the second rivet 18 and the rivet sleeve 19. The fixing member 21 engages in the fixing groove 173 of the guiding shaft 17, thereby preventing the guiding shaft 17 from detaching from the second rivet 18 and the rivet sleeve 19. The guiding shaft 17 is slidable relative to the second rivet 18 and the rivet sleeve 19. Thus, the sliding mechanism 10 is completely assembled, with two ends of the elastic member 15 abutting the connecting portion 171 of the guiding shaft 17 and a sidewall of the rivet sleeve 19 respectively.

When the sliding mechanism 10 is employed in the portable electronic device 200, the first housing 210 of the portable electronic device 200 is firmly secured to the main plate 11, and the second housing 212 of the portable electronic device 200 is firmly secured to the slide plate 12. The portable electronic device 200 may be selectively opened or closed. In use, FIG. 4 shows the slide plate 12 in a closed position relative to the main plate 11, FIG. 5 shows the slide plate 12 in a half-closed position relative to the main plate 11, and FIG. 6 shows the slide plate 12 in an open position relative to the main plate 11.

Figure 4:
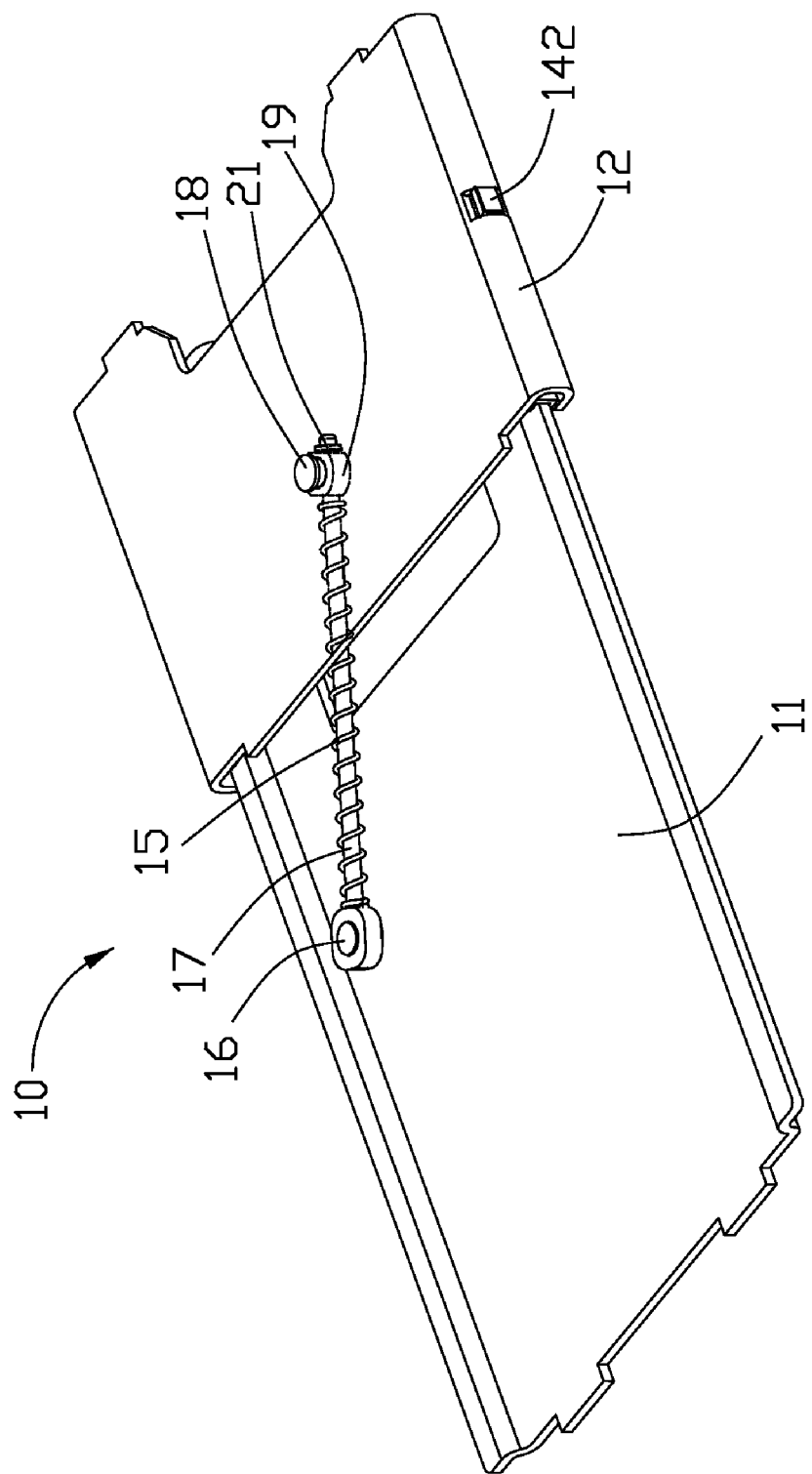
FIG. 4 is an assembled, isometric view of the sliding mechanism of FIG. 3, showing the slide plate in a closed position relative to the main plate.

Referring to FIG. 4, the slide plate 12 is at an end of the main plate 11, the elastic member 15 is in an original state and a distance between the first and second rivet 16, 18, respectively, is maximum. Referring also to FIG. 1, when the second housing 212 is pushed along a direction of the arrow shown in FIG. 1, that is toward an open position as shown in FIG. 2, the slide plate 12 slides relative to the main plate 11 as indicated by a direction of the arrow shown in FIG. 5. Therefore, the slide plate 12 together with the guiding rails 14 slide along the slide portions 114 of the main plate 11. The distance between the first rivet 16 and the second rivet 18 decreases and the guiding shaft 17 slides relative to the second rivet 18 and the rivet sleeve 19. The elastic member 15 is compressed, accumulating elastic force, and reaches the strongest elastic force when the slide plate 12 reaches the middle of the main plate 11.

Figure 5:
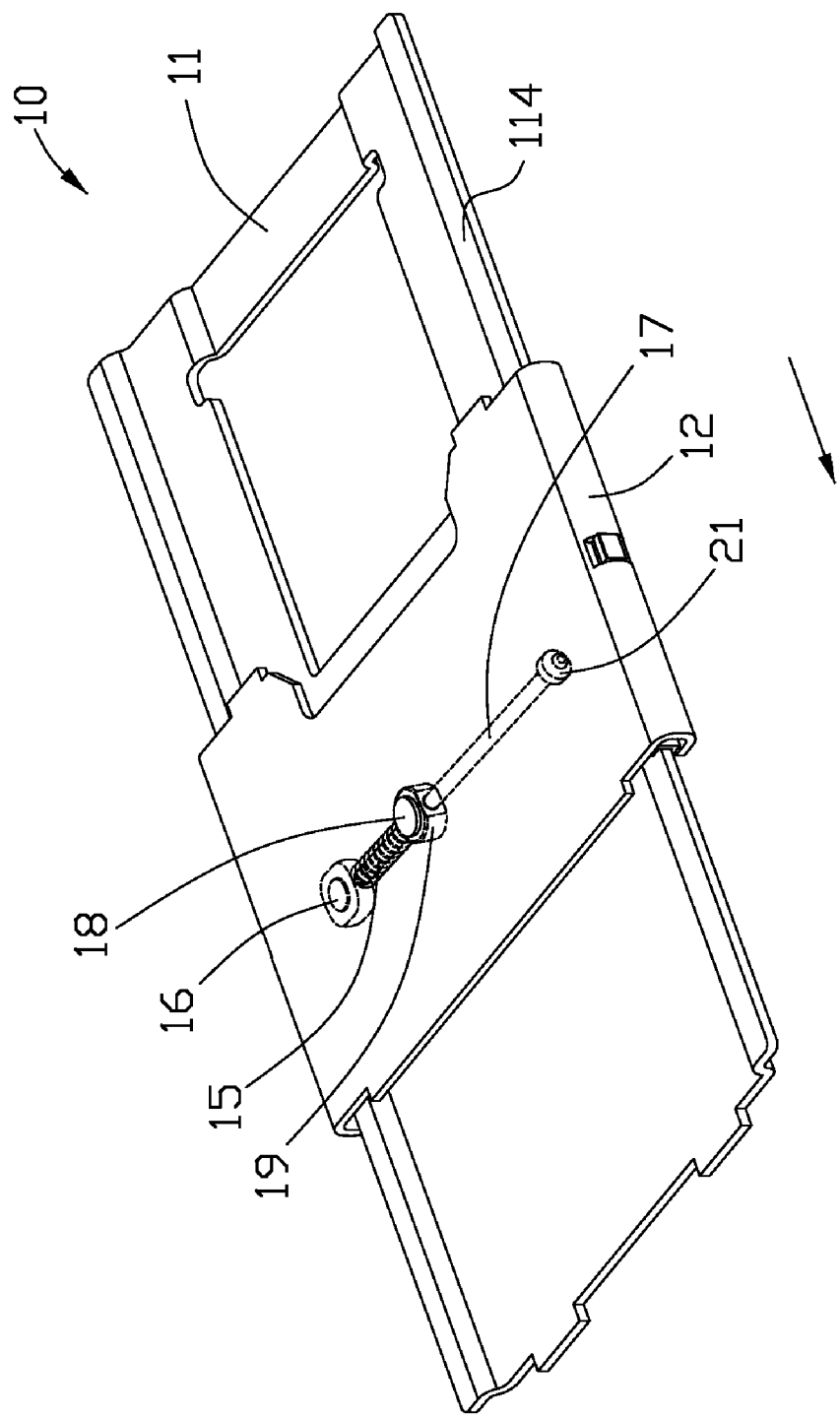
FIG. 5 is similar to FIG. 4, but showing the slide plate in a half-closed position relative to the main plate.
Figure 6:
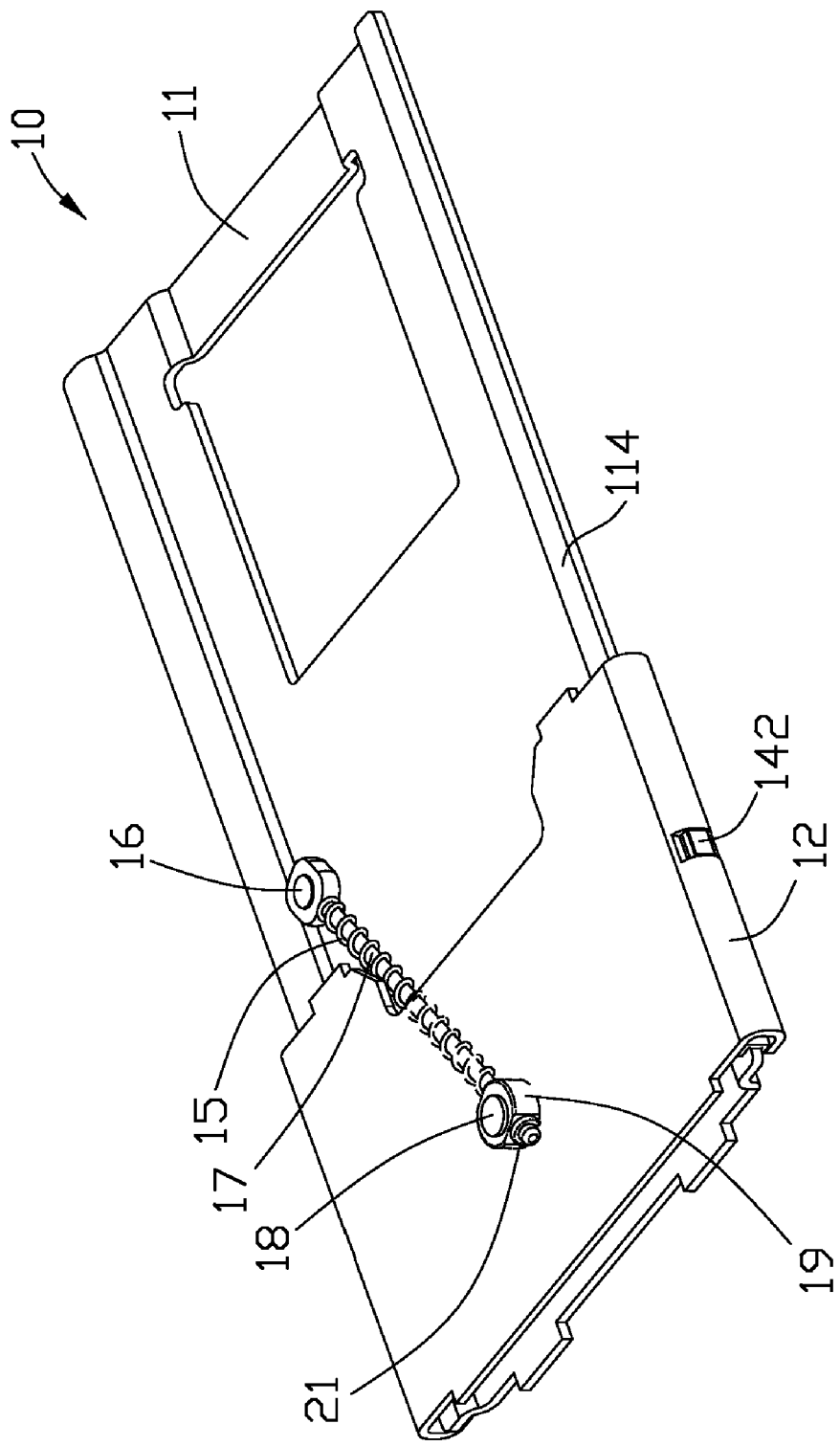
FIG. 6 is similar to FIG. 5, but showing the slide plate in an open position relative to the main plate.

As shown in FIG. 5, the elastic member 15 is most compressed in the middle of the main plate 11 and thereby storing a maximum elastic force. At this time, if the second housing 212 is pushed longitudinally in either direction away from the middle, the elastic force of the elastic member 15 is released along the direction of movement and the slide plate 12 slides under the influence of the elastic force of the elastic member 15 to either the open position of FIG. 6 or the closed position of FIG. 4.

If the movement continues in the direction as indicated by the arrow in FIG. 5 the second housing 212 is fully opened, relative to the first housing 210. The guiding shaft 17 is unable to slide relative to the second rivet 18 and the rivet sleeve 19 further. Consequently, as shown in FIG. 2, the keypad 214 on the first housing 210 is exposed for use. The slide plate 12 is in the open position relative to the main plate 11. The process of closing the second housing 212 is the reverse of the opening process.

In this embodiment, the elastic member 15 is positioned between the main plate 11 and the slide plate 12. Therefore, when the slide plate 12 slides relative to the main plate 11, the elastic member 15 will not come into contact with other components of the portable electronic device 200. Thus, the portable electronic device 200 is convenient to be operated. The sliding mechanism 100 includes a single elastic member 15 and a single guiding shaft 17 such that components of the sliding mechanism 100 are relatively few. Accordingly, the sliding mechanism 100 is easily assembled. In addition, the single guiding shaft 17 occupies a relatively small space for moving, and the space required in an application such as the portable electronic device 200 is reduced.

It should be pointed out that, the slide plate 10 and the main plate 20 can be integrally formed with the second housing 40 and the first housing 10 respectively.

Alternatively, the fixing member 21 may be some other type of fixing member such as a nut. With the condition, the fixing groove 173 of the guiding shaft 17 may be omitted, and the guiding shaft 17 defines a threaded hole corresponding to the nut. The slide plate 12 and the main plate 11 can be integrally formed with the second housing 212 and the first housing 210 respectively. The guiding rails 14 can be integrally formed with the slide plate 12.

Figure 7:
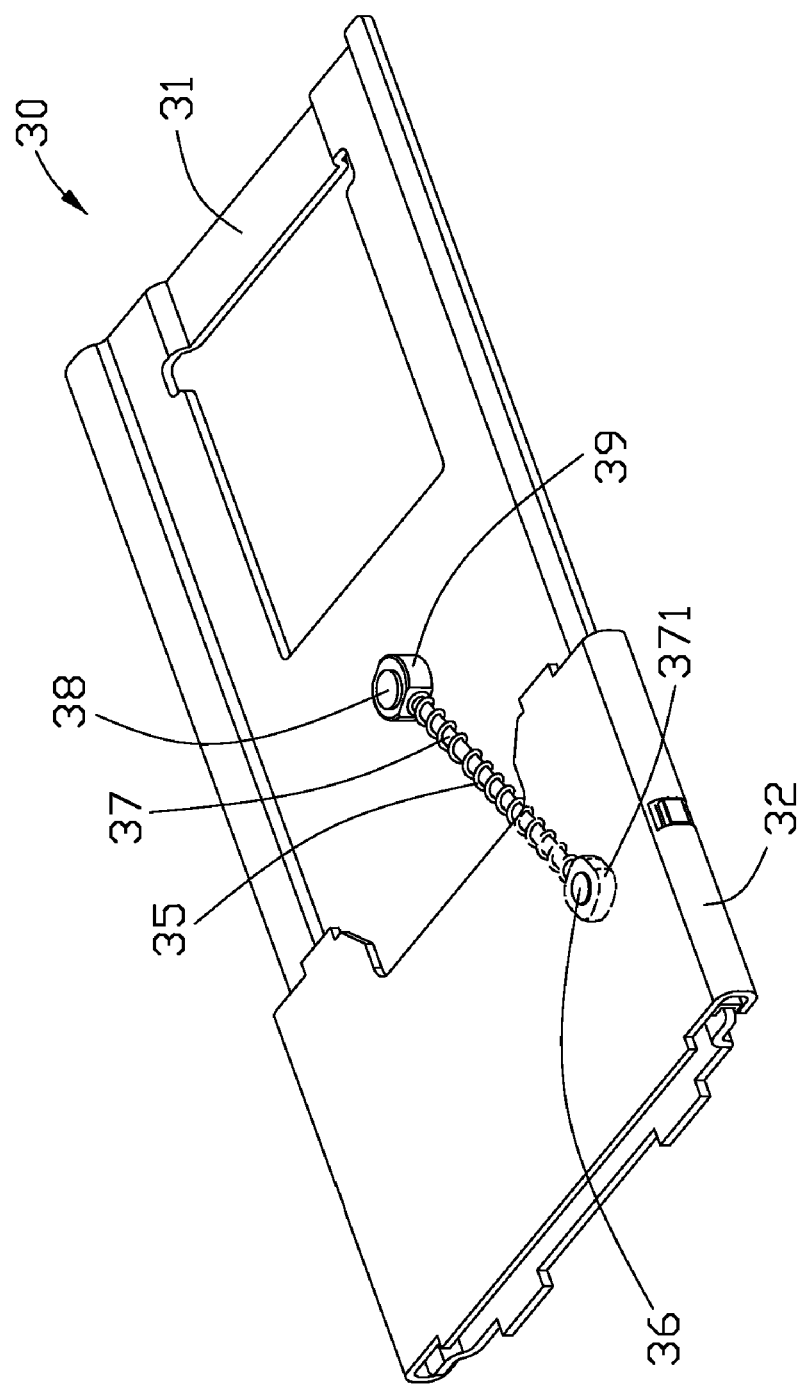
FIG. 7 is an assembled, isometric view of a sliding mechanism in accordance with a second exemplary embodiment of the present invention.
Figure 8:
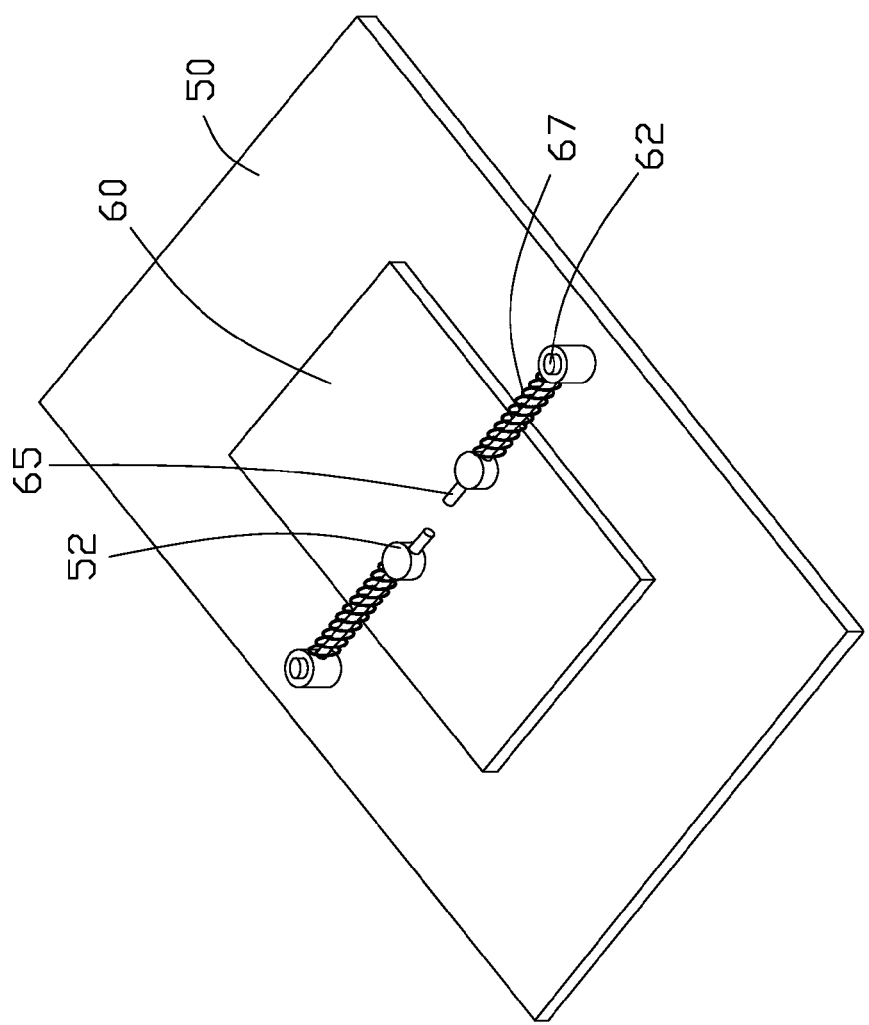
FIG. 8 is an assembled, isometric view of a typical sliding mechanism.

Referring to FIG. 7, a sliding mechanism 30 is provided according to a second exemplary embodiment of the present invention. The sliding mechanism 30 includes a main plate 31, a slide plate 32, an elastic member 35, a first rivet 36, a guiding shaft 37, a second rivet 38, and a rivet sleeve 39. A connecting portion 371 is formed on an end of the guiding shaft 37. The sliding mechanism 30 is similar in principle to the sliding mechanism 10, except that the connecting portion 371 of the guiding shaft 37 is rotatably connected to the slide plate 32 via the first rivet 36 inserted through the connecting portion 371 and the slide plate 32, and an opposite end of guiding shaft 37 protrudes through the second rivet 38 and the rivet sleeve 39 after the second rivet 38 and the rivet sleeve 39 is rotatably connected to the main plate 31.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A mobile device comprising a sliding mechanism, the sliding mechanism, comprising:
   a main plate;
   a slide plate slidably connected to the main plate;
   a linkage module positioned between the main plate and the slide plate, the linkage module including an elastic member and a guiding shaft, the elastic member being sleeved on the guiding shaft;
   a first rivet;
   a second rivet; and
   a rivet sleeve, an end of the guiding shaft being rotatably connected to one of the main plate and the slide plate, the second rivet and the rivet sleeve being rotatably connected to the other of the main plate and the slide plate, and an opposite end of the guiding shaft slidably protruding through the second rivet and the rivet sleeve, wherein the elastic member is configured for driving the slide plate and enabling the slide plate to slide along the main plate after the slide plate is manually moved to a predetermined position with respect to the main plate.

2. The sliding mechanism as claimed in claim 1, wherein the elastic member is a helical spring.

3. The sliding mechanism as claimed in claim 1, further comprising a first rivet, a second rivet, and a rivet sleeve, an end of the guiding shaft being rotatably connected to one of the main plate and the slide plate, the second rivet and the rivet sleeve being rotatably connected to the other of the main plate and the slide plate, and an opposite end of the guiding shaft slidably protruding through the second rivet and the rivet sleeve.

4. The sliding mechanism as claimed in claim 3, wherein the other of the main plate and the slide plate defines an engaging hole, each of the second rivet and the rivet sleeve defines a through hole, the through holes extend through the second rivet and the rivet sleeve, respectively, and the second rivet is inserted into the engaging hole and the rivet sleeve so that the second rivet and the rivet sleeve are rotatably connected to the other of the main plate and the slide plate.

5. The sliding mechanism as claimed in claim 4, wherein the connecting portion is formed on an end of the guiding shaft, a cylindrical surface of an opposite end of the shaft portion defines a fixing groove, and the sliding mechanism further comprises a fixing member for engaging in the fixing groove of the guiding shaft.

6. The sliding mechanism as claimed in claim 5, wherein the sliding mechanism further comprises a pair of guiding rails, a first sidewall of each of the guiding rails defines a guiding slot, the main plate is substantially rectangular and includes a main body, a pair of slide portions respectively extend from the two opposite long sides of the main body, and the slide portions of the main plate are inserted into the guiding slots of the guiding rails.

7. The sliding mechanism as claimed in claim 6, wherein the main body of the main plate defines a through hole and a pinhole, the through hole is configured for assembling the sliding mechanism easily, and the pinhole is configured for attaching the guiding shaft to the main plate.

8. The sliding mechanism as claimed in claim 6, wherein each of the guiding rails includes a second sidewall opposite to the first sidewall and a latching protrusion formed at the second sidewall, and the slide plate defines two latching holes for engaging with the latching protrusions of the guiding rails.

9. The sliding mechanism as claimed in claim 8, wherein the slide plate is substantially rectangular sheet-shaped, two arcuate sidewalls extend from two opposite sides of the slide plate, and the latching holes are defined in the arcuate sidewalls.

10. A portable electronic device, comprising:
    a first housing;
    a second housing slidably connecting to the first housing; and
    a sliding mechanism installed between the first housing and the second housing for guiding a sliding motion of the second housing relative to the first housing, the sliding mechanism including:
    a main plate;
    a slide plate slidably connected to the main plate;
    a linkage module positioned between the main plate and the slide plate, the linkage module including an elastic member and a guiding shaft, the elastic member being sleeved on the guiding shaft;
    a first rivet;
    a second rivet; and
    a rivet sleeve, an end of the guiding shaft being rotatably connected to one of the main plate and the slide plate, the second rivet and the rivet sleeve being rotatably connected to the other of the main plate and the slide plate, and an opposite end of the guiding shaft slidably protruding through the second rivet and the rivet sleeve, wherein the elastic member is configured for driving the slide plate and enabling the slide plate to slide along the main plate after the slide plate is manually moved to a predetermined position with respect to the main plate.

11. The portable electronic device as claimed in claim 10, wherein the elastic member is a helical spring.

12. The portable electronic device as claimed in claim 10, wherein the guiding shaft includes a connecting portion and a shaft portion, the connecting portion defines an engaging hole, one of the main plate and the slide plate defines a pinhole, the first rivet is inserted through the engaging hole of the connecting portion and the pinhole so that the guiding shaft is rotatably connected to one of the main plate and the slide plate.

13. The portable electronic device as claimed in claim 12, wherein the other of the main plate and the slide plate defines an engaging hole, each of the second rivet and the rivet sleeve defines a through hole, the through holes extend through the second rivet and the rivet sleeve respectively, and the second rivet is inserted into the engaging hole and the rivet sleeve so that the second rivet and the rivet sleeve are rotatably connected to the other of the main plate and the slide plate.

14. The portable electronic device as claimed in claim 13, wherein the shaft portion is formed on an end of the guiding shaft, a cylindrical surface of an opposite end of the guiding shaft defines a fixing groove, and the sliding mechanism further comprises a fixing member for engaging in the fixing groove of the guiding shaft.

15. The portable electronic device as claimed in claim 10, wherein the sliding mechanism further comprises a pair of guiding rails, a first sidewall of the guiding rails defines a guiding slot, a second sidewall opposite to the first sidewall forms a latching protrusion, the main plate is substantially rectangular and includes a main body, a pair of slide portions respectively extend from the two opposite long sides of the main body, and the slide portions of the main plate are inserted into the guiding slots of the guiding rails.

16. The portable electronic device as claimed in claim 15, wherein the main body of the main plate defines a through hole and a pinhole, the through hole is configured for assembling the sliding mechanism easily, and the pinhole is configured for attaching the guiding shaft to the main plate.

* * * * *